United States Patent
Crossley

(10) Patent No.: US 6,766,012 B1
(45) Date of Patent: Jul. 20, 2004

(54) SYSTEM AND METHOD FOR ALLOCATING AGENT RESOURCES TO A TELEPHONE CALL CAMPAIGN BASED ON AGENT PRODUCTIVITY

(75) Inventor: Colin D. Crossley, Hammersmith (GB)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/421,699

(22) Filed: Oct. 20, 1999

(51) Int. Cl.[7] .............................................. H04M 5/00
(52) U.S. Cl. ........................... 379/265.02; 379/265.05; 379/265.06; 379/265.1; 379/265.12; 379/266.07; 379/266.08
(58) Field of Search ............................... 379/265, 266, 379/220, 265.02, 265.05, 265.06, 265.07, 265.1, 265.12, 265.13, 266.05, 266.07, 266.08

(56) References Cited

U.S. PATENT DOCUMENTS

| | | | | |
|---|---|---|---|---|
| 5,164,983 A | * | 11/1992 | Brown et al. | 379/265.03 |
| 5,299,260 A | * | 3/1994 | Shaio | 379/266.07 |
| 5,390,243 A | * | 2/1995 | Casselman et al. | 379/266.08 |
| 5,517,566 A | * | 5/1996 | Smith et al. | 379/265 |
| 5,592,542 A | * | 1/1997 | Honda et al. | 379/266.05 |
| 5,592,543 A | * | 1/1997 | Smith et al. | 379/265 |
| 5,594,790 A | * | 1/1997 | Curreri et al. | 379/266.07 |
| 5,594,791 A | * | 1/1997 | Szlam et al. | 379/265.09 |
| 5,721,770 A | * | 2/1998 | Kohler | 379/266 |
| 5,768,360 A | * | 6/1998 | Reynolds et al. | 379/220 |
| 5,825,869 A | | 10/1998 | Brooks et al. | 379/265 |
| 5,828,747 A | | 10/1998 | Fisher et al. | 379/309 |
| 5,903,641 A | | 5/1999 | Tonisson | 379/266 |
| 5,946,375 A | * | 8/1999 | Pattison et al. | 379/112.01 |
| 5,963,635 A | * | 10/1999 | Szlam et al. | 379/309 |
| 6,163,607 A | * | 12/2000 | Bogart et al. | 379/266.01 |
| 6,345,094 B1 | * | 2/2002 | Khan et al. | 379/38 |
| 6,366,666 B2 | * | 4/2002 | Bengtson et al. | 379/265.06 |

* cited by examiner

Primary Examiner—Bing Bui
(74) Attorney, Agent, or Firm—Bourque & Associates, P.A.

(57) ABSTRACT

A method for allocating agents to telephone call campaigns by a telephony system is disclosed. The disclosed method is aimed at maximizing productivity of successful agents by prioritizing call distribution to those agents enjoying a high level of success with respect to a particular call campaign during a particular period of time. The method includes providing a plurality of agent resources to participate in at least one call campaign, establishing success criteria for each call campaign, assigning a success index to each agent for each call campaign, directing calls to the plurality of agent resources in a prioritized manner, whereby calls are connected to available agents in accordance with the value of agent success indexes from highest to lowest The method also includes updating each agent success index is based on the established success criteria while the call campaign is in progress. Thus, agents satisfying the established success criteria will receive high success indexes, which will result in those agents receiving more calls.

14 Claims, 5 Drawing Sheets

SYSTEM AND METHOD FOR ALLOCATING AGENT RESOURCES TO A TELEPHONE CALL CAMPAIGN BASED ON AGENT PRODUCTIVITY

FIELD OF THE INVENTION

This invention relates to telephony management systems and more particularly, to a method of allocating agents to at least one telephone call campaign based on agent productivity.

BACKGROUND OF THE INVENTION

Many business and customer service organizations utilize automated call distribution systems, which route incoming calls to operators or agents in one or more various departments. Such systems efficiently screen incoming calls and are capable of providing initial, preliminary information to the customer by automated voice in response to system prompts. As a need for an agent occurs, the inbound telephone system distributes the incoming call to an agent based on agent availability.

Additionally, credit collection agencies, telemarketers and other types of business utilize outbound automated dialing systems to efficiently reach customers by automatically dialing telephone numbers contained within a pre-selected group of call records. Upon detecting a voice, the automated dialing system connects the call to an agent, typically based on agent availability. However, if agents receive incoming or outbound calls without consideration of their capabilities or experience, many instances are presented where assigned agents are incapable of servicing a call. Placing such a call on hold while a more suitable agent is located is time consuming and cost inefficient, resulting in lost or abandoned calls.

In an attempt to direct specific incoming calls to pre-selected agents, prior art systems utilize agent splits or hunt groups. These systems require incoming call campaigns to be pre-set such that specific calls are directed to pre-selected agents. However, these system are limited in that agents are not selected dynamically as the call campaign is active based on agent attributes. Rather, agents are bound to an incoming call campaign prior to activation of the call campaign.

More sophisticated prior are systems and methods, such as the system and method disclosed in commonly-owned U.S. Pat. No. 5,592,543, which is incorporated herein by reference, provide systems and methods for allocating agents to telephone call campaigns by a telephony system for servicing call records contained in call campaigns. Such systems allocate agent resources to service telephone call campaigns based on agent experience and expertise, and not solely on first availability. While such systems take into account the fact that certain agents possess higher proficiency for certain tasks, they do not account for dynamic proficiency changes, which may be based in whole or in part on specific attributes of a campaign or dynamically changing agent attributes.

For example, everyone has good days and bad days, including call center agents. In addition, depending on the nature of the current call campaign, such as a product being sold, etc., certain agents are going to be able to succeed on a higher percentage of calls than they normally do. Likewise, on other days, or other campaigns, some agents will not succeed much at all.

Accordingly, what is needed is a productivity-based method of agent resource allocation, which is aimed at identifying those agents who, for whatever reason, are doing well at a particular point in time with respect to a particular call campaign and which will automatically give those higher-producing agents preference when assigning calls. In this manner, a call center could increase the number of successful calls that are handled in a particular time period.

Such a method would also be advantageous to call center agents themselves who are paid commissions upon the completion of successful calls, since call center agents who are performing well are rewarded by receiving the opportunity to be increasingly successful. In addition, with respect to overall call center efficiency, such a method would account for agents who are not overly successful during a particular time period by reallocating the priority calls to those agents who are enjoying a higher success rate.

SUMMARY OF THE INVENTION

In accordance with the present invention, a method for allocating agents to at least one telephone call campaign by a telephony system is provided for servicing call records contained within the telephone call campaign(s). The method is aimed at maximizing productivity of successful agents by prioritizing call distribution to those agents enjoying a high level of success with respect to a particular call campaign during a particular period of time.

The method begins by providing a plurality of agent resources to participate in at least one call campaign to be managed by a telephony system. Then a call center supervisor or other person responsible for the success of a particular call campaign establishes success criteria for each call campaign to be managed by the telephony system.

A success index is assigned to each agent participating in the call campaigns managed by the telephony system. A particular agent will have a separate success index assigned to him or her for each call campaign in which that agent participates.

Next, during the processing of each call campaign, calls are directed to the plurality of agent resources in a prioritized manner, whereby calls are connected to an available agent having a high success index before they are connected to agents having lower success indexes. Each agent's success index is updated dynamically based on the established success criteria while the call campaign is in progress. Thus, agents satisfying the established success criteria will receive high success indexes, which will result in those agents receiving more calls. In addition, since the updating step occurs dynamically, as particular agents become increasingly or decreasingly successful, the system will reallocate the prioritization of calls thus, taking advantage of those immediately successful agents.

The system and method includes various strategies for selecting agent priority increases. For example, agents who exceed a threshold number of success events during an established time period will receive a higher agent success index. In the alternative, those agents who record the highest relative number of success events in an established time period may be assigned high agent success indexes. Of course, since agent priorities will be based on success indexes related to current performance, agent success indexes may decrease as different agents become increasingly successful beyond the success levels achieved by previously successful agents.

Thus, since calls will be directed to those agents who are experiencing a high degree of current success, the overall efficiency and productivity of the call center in general will be enhanced.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
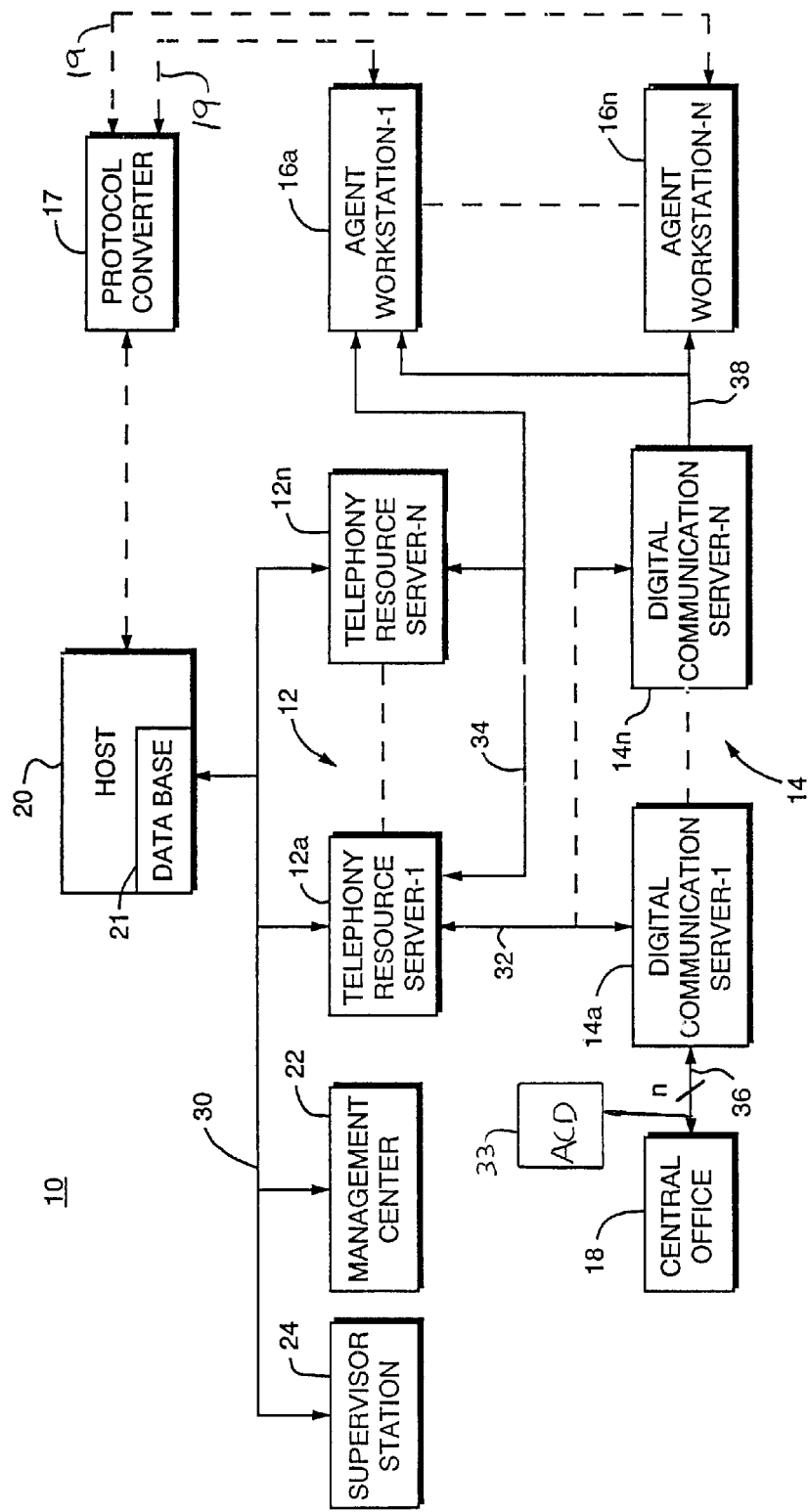
FIG. 1 is a block diagram of a telephony system capable of call processing in accordance with the present invention.

An exemplary telephony system 10, FIG. 1, capable of controlling and combining inbound call processing and outbound dialing automation and on which the method of the present invention may be practiced includes a telephony resource server 12, coupled to a digital communication server 14 as well as a supervisor station 24 and management center 22. A telephony resource server 12, digital communication server 14, supervisor station 24 and management center 22, may be provided, for example, as the Davox Unison® system manufactured by Davox Corporation, Westford, Mass. The system may provide a plurality of telephony resource servers 12a–12n, generally denoted as 12, for increased capabilities. Similarly, the system may provide a plurality of digital communication servers 14a–14n, generally denoted as 14.

Telephony resource server 12 initiates and maintains outgoing call campaigns and integrates incoming call center campaign activities with a customer provided inbound call distributor (ACD 33), which is coupled to the present system. Call campaign parameters are generated by the supervisor/customer at the supervisor station 24 in response to menu-driven prompts. Call campaigns may be monitored by one or more management centers 22 once initiated by telephony resource server 12.

Telephony resource server 12 comprises various functions, discussed below in greater detail in conjunction with FIGS. 2A and 2B, which interact with the other components of the telephony platform 10 to maintain the active call campaigns.

For outgoing call campaigns, telephony resource server 12 obtains a group of call records from a database 21 within a host system 20 via signal path 30. The telephony resource server 12 processes the call records as directed by preselected system scripts and sends a request to digital communication server 14 to place a telephone call to a telephone number contained within the call record.

Digital communication server 14 detects a dial tone and places a call to a telephone number over a trunk line 36 through the central telephone company switching office 18. Once a call is answered, the digital communication server forwards the voice portion of the call over voice path 38 to the headset of a preselected agent located at one of a plurality of agent workstations 16a–16n, generally denoted as 16. The agents are preselected by the telephony resource server 12 in response to the initial call campaign parameters established by the supervisor/customer at the supervisor station 24.

In one embodiment, the agent at agent workstation 16 interfaces with the telephony resource server 12 over signal path 34 to receive customer information from host system 20 over signal path 30. In another embodiment, the agent interacts directly with host 20 and data path 19 through protocol converter 17. In response, host system 20 sends data concerning each call record to the requesting agent workstation 16.

For inbound calls, in one embodiment, the central office 18 sends incoming calls to digital communication server 14 via a plurality of T1 type preselected telephone lines within trunk 36. In response, digital communication server 14 sends an incoming call signal over signal path 32 to telephony resource server 12 for inbound call processing. Telephony resource server 12 processes the incoming calls in accordance with preselected system scripts, discussed in greater detail in conjunction with FIGS. 2A and 2B, below, sending data over signal path 34 and directing digital communication server 14 to send the incoming call to a preselected agent at agent workstation 16 over voice path 38.

In another embodiment, incoming trunk lines 36 from the central office 18 are coupled to the customer's incoming call distributor 33 (ACD) prior to the incoming calls being handled by the digital communication server 14.

Figure 2A:
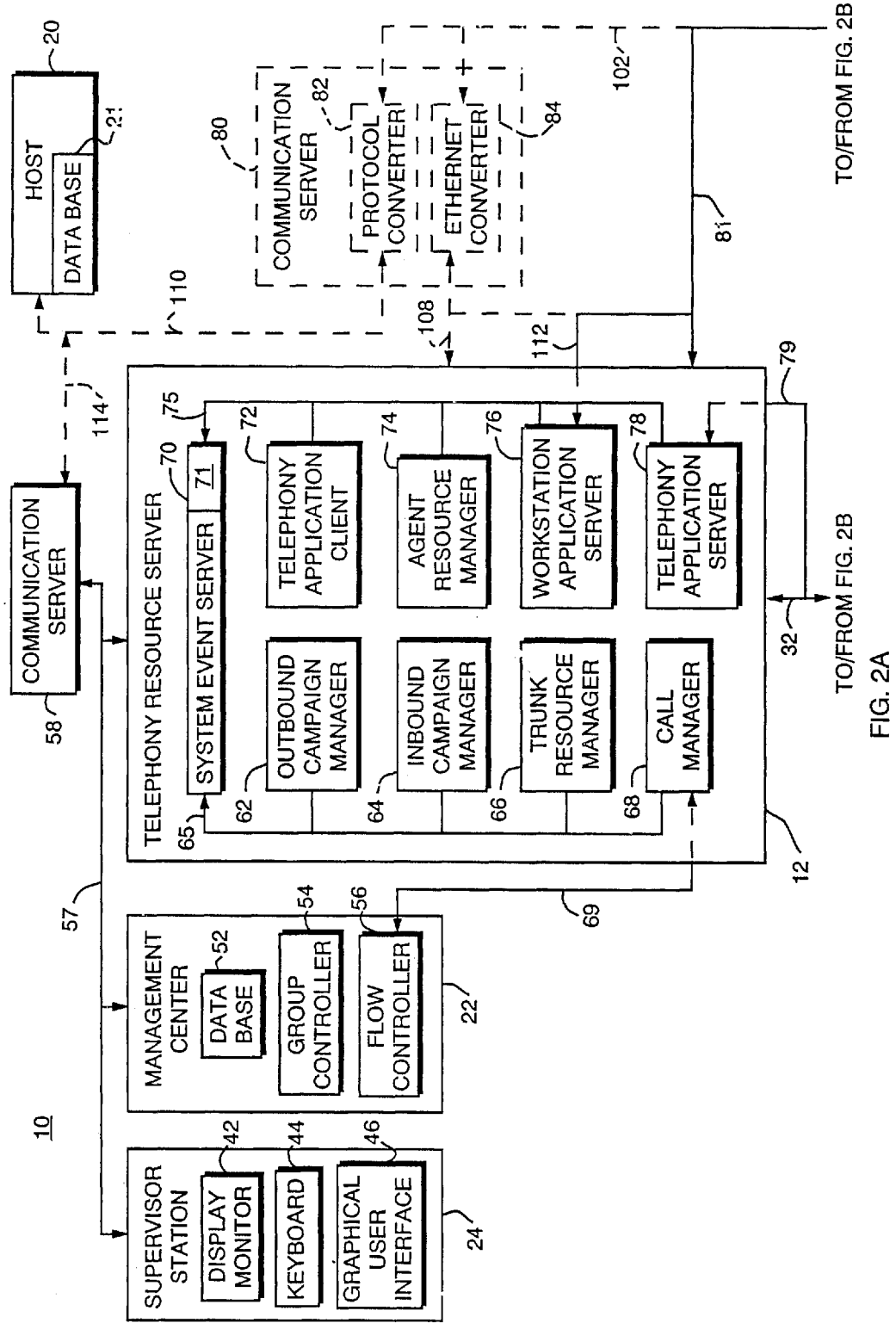
FIGS. 2A and 2B are block diagrams showing in more detailed description of the telephony system of FIG. 1.
Figure 2B:
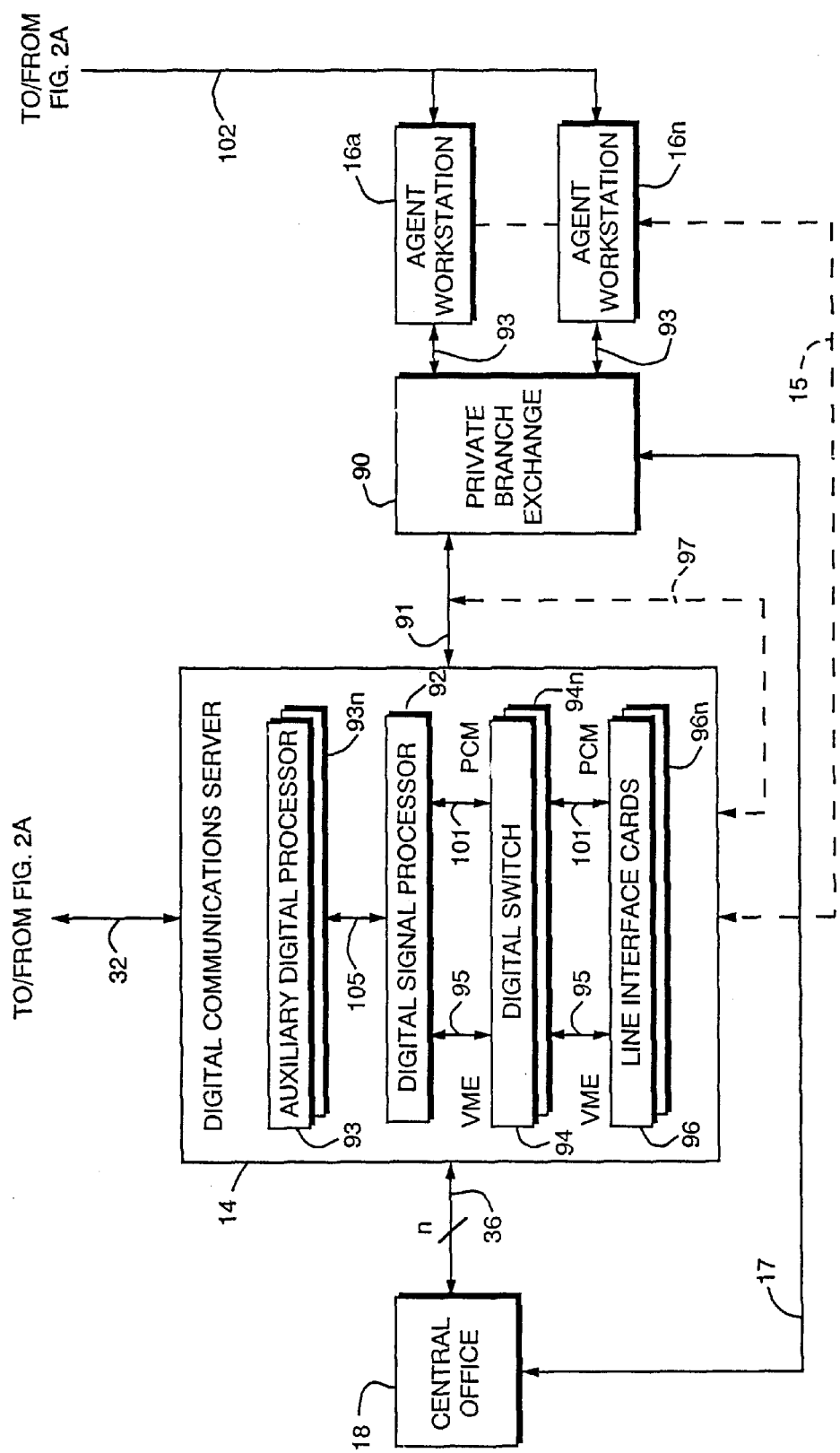

Referring now to FIGS. 2A and 2B, the functional components of the telephony platform 10 are discussed in greater detail. The supervisor/customer logs in at supervisor station 24 to establish inbound and outbound call campaigns. Supervisor station 24 typically includes a display monitor 42 featuring color bitmapped graphics, a keyboard 44 and a graphical supervisor/customer interface 46 and is further described in U.S. Pat. No. 5,343,518, issued on Aug. 30, 1994, and assigned to the assignee of the present invention and incorporated herein by reference. The supervisor station 24 may be provided, for example, as a SUN IPC model workstation manufactured by Sun Microsystems, Chelmsford, Mass.

The supervisor/customer establishes both inbound and outbound call campaigns in response to menu-driven prompts provided by the graphical supervisor/customer interface 46. System scripts are generated through a layered approach to define system behavior to the extent necessary for the desired call campaign. The highest layer interface is simply a form to be filled in by the supervisor/customer based on a specific call campaign application, for example, an outbound dialing call campaign versus an inbound call campaign. If a more complex set of criteria is necessary or desired, the supervisor/customer may be presented with a lower layer comprising more complicated forms to allow the supervisor/customer to better define the behavior of the telephony platform 10.

A system script is activated when a defined event occurs, such as a call record to dial, an incoming call is received, a function key is pressed at an agent workstation 16, etc. A script may also be bound by the supervisor/customer to specific events, being activated when the event is posted by the system, such as when a call is completed, a time of day, etc.

In addition to system scripts, the supervisor/customer generates other campaign parameters for each call campaign, such as how the telephony resource server 12 should respond in the event of a busy dial tone, a no answer dial tone, etc. Further, agent and trunk parameters are defined by the supervisor/customer, discussed below in greater detail, as well as how the system should process the particular call campaigns. Once the call campaigns have been defined, the supervisor/customer notifies the telephony resource server 12 over signal path 30 that the particular call campaign is ready to start.

For an outbound call campaign, the outbound campaign manager 62 of telephony resource server 12 is directed to begin the call campaign. The outbound campaign manager 62 receives a group of call records from a host system 20, each call record including a telephone number for the outbound campaign manager 62 to dial. Depending on the type of host system 20 used to generate the batch of call records, a communication server 58 may be required to permit the host system 20 to communicate with the telephony resource server 12. Communication server 58 may be a protocol converter used for converting the communication protocol used by host system 20, typically a SNA or Token-Ring protocol, over bus 114, to the communication protocol utilized by the telephony resource server, typically a TCP/IP protocol, over bus 57.

The group of call records sent to the outbound campaign manager 62 is selected in response to one or more call record selection criteria initially generated by the supervisor/customer. The call record selection criteria defines and groups call records with similar characteristics within the call record database 21 of host system 20. As records are selected, system scripts initially generated by the supervisor/customer are activated to initiate dialing activity. The supervisor/customer may monitor the processing of the telephony system by the outbound campaign manager 62 at the management center 22. Management center 22 typically includes a database 52 for storing the call records downloaded from host system 20, a group controller 54 and a flow controller 56, and 21 is further described in part in commonly-owned U.S. Pat. No. 5,343,518.

Flow controller 56 is provided for linking a plurality of call campaigns in a selected order and to apply the call campaigns to the telephony resource server 12 via the call manager 68 over signal path 69. The call manager 68 processes and formulates the outbound call campaign as directed by the preselected campaign parameters or system scripts, and forwards the outbound call campaign to the outbound campaign manager 62. The flow controller may also change the order in which the call campaigns are joined, all such changes being performed in real-time, even after being applied by the telephony resource server 12.

Group controller 54 is provided for monitoring the call campaign in real-time. The supervisor/customer may modify the particular outbound call campaign, as well as the inbound call campaign discussed below, by changing the preselected campaign parameters, system scripts or call record selection criteria. All such changes are performed in real time. The outbound campaign manager 62 provides a supervisor/customer interface to enable modifications to the outbound call campaign while the campaign is active in response to modifications made by the supervisor/customer.

The campaign parameters initially generated by the supervisor/customer further include campaign resources such as agents and/or outbound dialing trunks which possess predetermined resource attributes. A telephony application client 72 (discussed in more detail below) sends a request to the agent resource manager 74 for an agent possessing specific agent attributes as defined by the supervisor/customer. The agent resource manager 74 monitors available agents possessing the specified agent attributes and upon availability allocates an agent possessing the specified attributes to the telephony application client 72.

Similarly, the telephony application client 72 sends a request to the trunk resource manager 68 for an outbound trunk possessing specific trunk attributes as defined by the supervisor/customer. The trunk resource manager 68 monitors available trunks possessing the specified trunk attributes such as least cost routing, ISDN trunk, direct line, etc. and allocates a trunk possessing the specified attributes to the telephony application client 72.

The agent resource manager 74 and the trunk resource manager 68 report particular agent log-ons and log-offs and trunk availabilities to the system event server 70, discussed below in greater detail, thereby providing real-time detailed information on the agent and trunk resources. By monitoring the stream of events occurring within the system, the outbound campaign manager 62 determines when it is time to initiate each new outbound dial. Once an agent resource and/or trunk resource is available to service the outbound dial, the outbound campaign manager 62 obtains a call record and initiates the telephony application client 72, preselected by the supervisor/customer at the start of the particular outbound call campaign, to process the call record.

The telephony application client 72 includes programs, campaign call scripts, or other processes that make use of the telephony platform 10 resources to perform telephony operations. The telephony application client 72 may be started by the outbound campaign manager 62 to process a call record or an outbound dialing application or the inbound campaign manager 64 to process an incoming call, or it may be started by the system event server 70 to perform some programmed response to a system defined event.

The telephony application client 72 sends a request to the telephony application server 78 to initiate a call according to the parameters generated by the outbound campaign manager 62, including a particular outbound trunk and agent to service the call record.

The request to generate an outbound call from the telephony application client 72 includes dialing instructions such as the maximum number of rings allowed before declaring a no answer. The telephony application server 78 further directs the digital communication server 14 to wait and listen for predetermined signal patterns and to return a status signal indicating what signal pattern was detected. Predetermined signal patterns include busy tones, voice detection, answering machine, modem/fax signals, etc.

The digital communication server 14 detects, reports, and generates a variety of signals, and detects specific states on a particular digital switch port using digital signal processor 92. Further, digital signal processor 92 is capable of playing digitized voice, as well as recording and play back of incoming voice via PCM bus 101. Digital voice messages are stored on disk, and transferred from the telephony resource server 12 over path 32, and referenced by campaign call scripts directed by telephony application server 78 over signal path 79. An auxiliary digital signal processor 93 may be used for expansion capability. Those skilled in the art will recognize that a plurality of auxiliary digital signal processors 93a may be used for increased expansion capability. Communication between the digital signal processor 92 and the auxiliary digital signal processors 93a is accomplished by a plurality of ethernet buses 105.

Digital signal processor 92 interfaces with digital switch 94 over VME communication bus 95 and PCM communication bus 101. Digital switch 94 includes switch ports which may attach to T1 channel 36, agent headsets of agent workstations 16 and private branch exchange 90 extensions. A plurality of digital switches 94n may be used for increased switching capability.

Local internal switch 94 interfaces with line interface card 96 over VME communication bus 95 and PCM communication bus 101 and provides for rapid switching between an agent and the incoming/outgoing trunk lines. Line interface card 96 optionally interface with the agent workstations 16 directly over voice path 15 or via private branch exchange 90, over T1 telephone lines 97, to provide T1, analog and audio interface functions. A plurality of line interface cards 96n may be used for increased capability.

The private branch exchange 90 scans voice path 93 to agent workstation 16 to connect the outside third party, reached by an outbound call record dial, or an inbound calling party, to the headset of the agent preselected by the outbound campaign manager 62 or inbound campaign manager 64.

Three-way connections between the agent, outside third party and the agent's supervisor may be made, enabling features such as conferencing and consulting via the digital switch 94 and serviced by the telephony application server 78.

Upon receiving an outbound call over voice path 93 to the agent's headset, the system automatically provides customer information contained within the call record from the host.

In the preferred embodiment, agent workstations 16 are data terminals which utilize an ethernet network. Direct communication may be made with the telephony resource server 12 over bus 81, and in particular to the workstation application server 76 over bus 112 which also utilizes an ethernet network.

The workstation application server 76 interfaces with the host system 20 by means of a forms package which has the ability to access the call record database containing customer information and to forward the customer information to the workstation screen at the agent workstation 16. Further, the forms package has the ability to update this database based on responses by the agent at the agent workstation 16 to forms package prompts.

In an additional embodiment, the agent workstation 16 may be a dumb terminal utilizing a proprietary asynchronous communication protocol over line 102 requiring a communication server 80, illustrated in dashed lines, as a protocol converter. To permit communication with the telephony resource server 12 over bus 108, and in particular, with the workstation application server 76, over bus 112, proprietary asynchronous line 102 is converted by ethernet converter 84 to an ethernet network thereby allowing compatibility with workstation application server 76. For direct communication with the host system 20 over bus 110, proprietary asynchronous line 102 is converted to the protocol utilized by host system 20, typically SNA or Token-Ring, by protocol converter 82. The telephony resource server 12 further includes a system event server 70 for providing the supervisor/customer real-time access to the current status and detail information on campaigns, agents, trunks, etc. The supervisor/customer may access this information through graphical supervisor/customer interface 46 at the supervisor workstation 24, as well as through a standard spread sheet or reporting package.

The system event server 70 is the central focal point for posting system events and maintaining real-time information as to current system activity. All of the functional components within the telephony resource server 12 communicate with the system event server 70 as indicated by signal paths 65 and 75 to maintain current system activity. All system events which can be posted by the system are predefined by the supervisor/customer and posted in an event database 71 within the system event server 70 as specific events occur. As system events are posted in the event database, system statistics, stored in the statistics database within the system event server 70, are updated thereby providing the supervisor/customer with real-time system information.

For an inbound call campaign, the supervisor/customer first establishes an inbound call campaign at the supervisor station 24 in the same manner as for an outbound call campaign, described above. The supervisor/customer specifies campaign parameters, agent attributes, system scripts and campaign resources. For example, an inbound call campaign may generate a system script which would wait for an incoming ring, seize a preselected originating trunk, request an agent having certain attributes, and place the caller on hold until an agent becomes available. A different system script may direct originating calls into the central office 18 to bypass the digital communication server 14 and directly connect to the private branch exchange 90 over T1 telephone line 17, for forwarding to a preselected agent at agent workstation 16.

Inbound call campaigns generated by the supervisor/customer are managed by the inbound campaign manager 64 within the telephony resource server 12. The inbound campaign manager interfaces with the digital communication server 14 over signal path 32 upon detection of incoming calls by the digital communication server 14. The inbound campaign manager 64 receives campaign resources from the trunk resource manager 68 and agent resource manager 74 and initiates inbound dialing system scripts as directed by the inbound call campaign.

Generally speaking, there are three types of agent attributes which may be established. These include static attributes, local attributes and dynamic attributes. Static attributes are set up once when an agent is first enrolled and are typically attributes which are not frequently changed. Typically, static agent attributes are set up by the supervisor and include, for example, characteristics such as foreign language capabilities.

Local attributes are set up by the agent at the time of log in, perhaps in response to system queries or questions. Local attributes typically have a duration, such as the log in day or the log in campaign or may be further time based. Examples of local attributes are which campaigns the agent wishes to work on; or goals for the day such as the dollar value of overdue accounts which the agent wishes to collect.

Finally, dynamic agent attributes are changed by the telephony system itself in order to maintain system performance and include attributes such as campaign attributes, which allow the agent to handle multiple campaigns even though the agent may have logged on to only one or two actual campaigns. As will be more fully explained below, one example of a dynamic agent attribute includes an agent success index associated with a particular call campaign.

A system and method of allocating agents to service call records, which is based on agent attributes is more fully described in commonly-owned U.S. Pat. No. 5,592,543, which is fully incorporated herein by reference.

Figure 3:
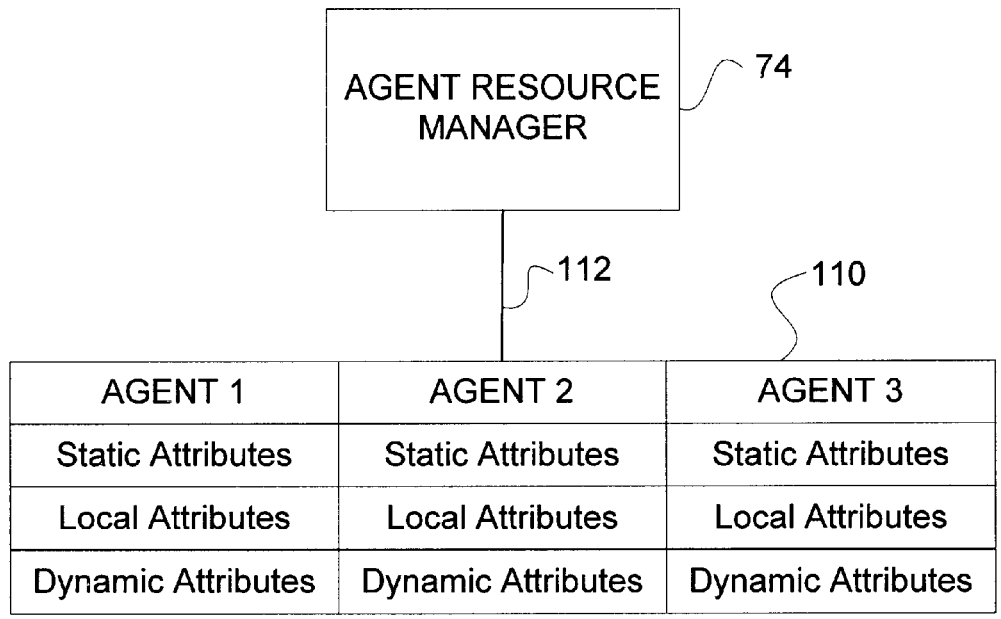
FIG. 3 is a diagramatical representation of an agent attribute database interfacing the agent resource manager of FIG. 2A.

Agent attributes are maintained in an agent attribute database 110 (FIG. 3), which interfaces agent resource manager 74 over data link 112. Accordingly, whenever the agent resource manager 74 is to connect a call to an agent, the agent resource manager 74 may search the agent attribute database 110, review the agent attributes associated with the agents that are available to be connected to the call, and select an agent to connect based on the agent attributes.

As indicated above, each agent may have associated with him or her, static, local and dynamic agent attributes.

Figure 4:
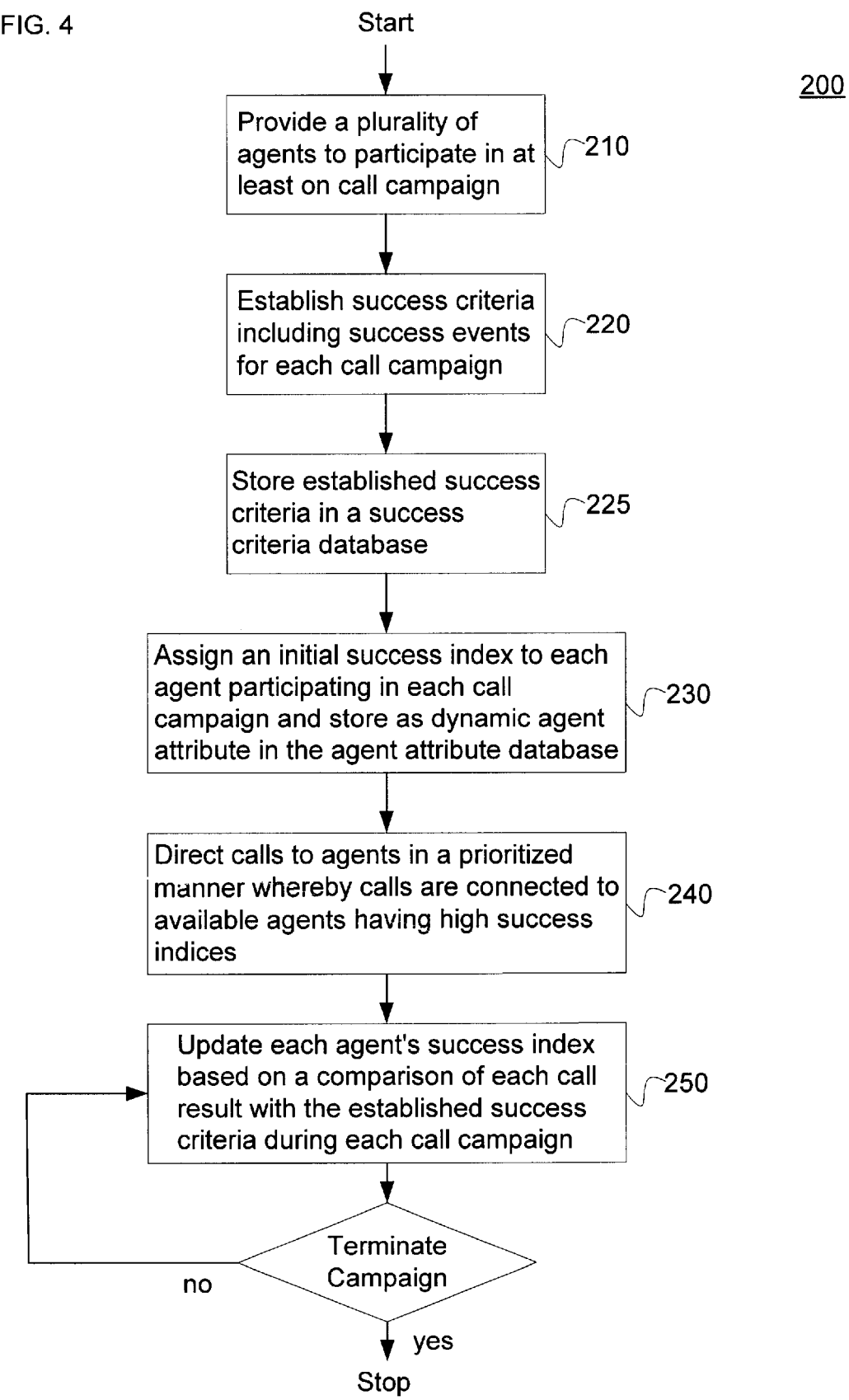
FIG. 4 is a flow diagram showing the steps of a method of allocating agent resources based on agent productivity according to the present invention.

Referring now to FIG. 4, a method 200 for allocating agent resources to automatically increase the productivity of successful agents by increasing the number of calls that they receive over their less successful colleagues according to the present invention is provided. First, in step 210, a plurality of agents are provided to participate in at least one call campaign. As indicated earlier, a call center may, at any given time, be managing more than one call campaign. Typically, a system supervisor or customer will establish success criteria for each call campaign, step 220. Such success criteria preferably includes readily ascertainable success events related to a call. For example, if an outbound call campaign is related to the sale of a product or a service, then a typical success event would comprise the sale of the product or service. Alternatively, a readily ascertainable success event may include the setting of an appointment of a sales or service representative to contact or visit a prospective customer. Then, in step 225, the success criteria for each call campaign is stored in a success criteria database for future comparison purposes.

Next, in step 230, an initial general or campaign specific success index is assigned to each agent participating in each call campaign. Each agent success index is stored as a dynamic agent attribute in the agent attribute database 110.

An initial agent success index may be assigned based on an agent's past performance record related to previous call campaigns or it may be an arbitrary or an initial preassigned beginning value. However, as will become more apparent below, any initial success index value will be updated for each agent as each call campaign progresses.

The present invention recognizes the fact that everyone has good days and bad days, including call center staff. In addition, depending on the nature of a call campaign, for example, a particular product being sold, on some days certain agents will succeed on a higher percentage of calls then they normally do. Likewise, on certain days, for the same reasons, some agents will not be particularly successful. Accordingly, productivity-based agent prioritization aims to identify those agents who, for whatever reason, are doing well during a particular period of time and, accordingly, will automatically give those agents preference in handling calls for that campaign over those agents who are not doing particularly well. The purpose of this strategy is to increase the number of successful calls that a call center will make in a day.

In call centers where commissions are paid on the completion of successful calls, agents who do well will be financially rewarded by receiving the opportunity to be increasingly successful. On the other hand, although agents who do not do so well will not receive high levels of financial compensation, the overall productivity of the call center in general will remain high while allowing successful agents to handle more calls.

Accordingly, in the disclosed method of the present invention, calls are directed to agents in a prioritized manner whereby a call is connected to an available agent having a high success index, step 240. As indicated above, each agent may have a success index associated with each call campaign that the agent is assigned to. Therefore, the agent resource manager 74 will need to retrieve call campaign information associated with a connected call and review each available agent's dynamic attributes in the agent attribute database 110 to determine which available agent has the highest success index associated with the call campaign related to the connected call. When more than one agent has the same campaign specific success index, then alternative or additional methods of selecting the agent to handle the call may be utilized. Such methods may include reviewing additional agent attributes, such as agent idle time, which would be stored in the agent attribute database 110 as a dynamic agent attribute.

The disclosed invention contemplates alternative methods of selecting agents for priority increases. In one embodiment, agents who record a threshold number of success events during a particular time period, such as an hour, a day, a week, a campaign, etc., will be given high success indexes. For example, agents who exceed more than 20 sales for a particular day will be automatically given preference over those agents who have not reached the 20 sale per day threshold.

Alternatively, the method may include a relative prioritization strategy. For example, agents who have recorded the top 10% of success events within a one hour time period may have a high success index and, accordingly, receive more calls than those agents who have recorded, for example, the bottom 10% of sales within the same time period.

As indicated earlier, since agent priority is determined in real time, day by day, hour by hour or campaign by campaign, rather than being generically set, each agent's success index will be updated based on a comparison of each call result with the established success criteria stored in the success criteria database during each call campaign, step 250. Thus, as a particular call campaign progresses, each agent's success index will vary depending on that agent's current success in handling calls related to a specific call campaign.

Since, as indicated above, a call center may be simultaneously running a plurality of call campaigns, each call center agent may have a separate success index associated with each call campaign in which the agent is participating. Accordingly, the method will account for the fact that certain agents may be particularly successful in handling calls associated with certain campaigns while, at the same time, be less successful in handling calls associated with different campaigns. Since agent prioritization will be campaign specific, agents exhibiting high levels of current success in each campaign will receive more calls related to that campaign than those agents exhibiting lower levels of success. Since this strategy will be applied to each campaign handled by a particular call center, then the success of each campaign will be maximized.

Since a call center telephony system will be supervised by a call center supervisor, the established success criteria for each call campaign may be modified, in real time, during a call campaign in response to actual call results. For example, while an initial success event for a campaign may be the sale of a product or service during the call, a call center supervisor may observe that very few success events are being achieved by the call center agents. However, the call center supervisor may observe that certain agents are scheduling a large number of follow-up appointments by sales representatives related to the sale of the products of the campaign. Therefore, the supervisor may modify the success criteria to include the setting of an appointment as an additional success event.

Just as an agent's success index may be increased based on a level of success experienced by an agent during an established time period during a call campaign, an agent's success index may also be decreased if an agent fails to maintain a high level of success during an established time period. For example, an agent who exceeds a threshold number of sales during a one hour period may be assigned a high success index during the next one hour period. However, during the subsequent one hour period if the prioritized agent does not again exceed the predetermined threshold number of sales, then that agent's success index may be reduced.

The invention contemplates deciding agent success indexes along a variable scale, wherein the agent achieving the highest level of success receives the highest success index, and the agent achieving the lowest level of success would receive the lowest success index. In this manner, calls could be directed to the available agent having the highest success index for a particular campaign.

An alternative embodiment of the invention contemplates the use of a plurality of agent priority levels. In this embodiment, each agent would be assigned a priority level based on performance. For example, the top 10% of agents would receive a Priority 1. The top 11–20% would receive a Priority 2. The top 21–30% would receive a Priority 3, and so on. Of course, the priority bands can be broad or narrow depending on the requirements of a particular call center and a particular call campaign. As with the agent priority indexes mentioned above, agent priority levels would also be updated dynamically during a call campaign based on actual, current agent performance.

Accordingly, the disclosed invention determines agent priority in real time, day by day, hour by hour, etc. rather than being generically set based on historical performance trends. In addition, agents are automatically selected for priority increase or decrease depending on how they are currently performing. Thus, a supervisor is not required to monitor agent performance and manually increase or decrease agent priority levels based on observed performance. Accordingly, the disclosed system accounts for the "human factor" of agents having good days and bad days and maximizes call center efficiency by ensuring that more calls are given to those agents having goods days than those agents having bad days. It also recognizes that certain agents may be better suited to handling certain types of call campaigns over others.

Modifications and substitutions by one of ordinary skill in the art are considered to be within the scope of the present invention which is not to be limited except by the claims which follow.

What is claimed is:

1. A method of allocating agent resources to at least one telephone call campaign in a telephony system to maximize productivity of successful agents, said method comprising the acts of:
   a) providing a plurality of agent resources to participate in the at least one telephone call campaign to be managed by said telephony system;
   b) establishing at least one success criteria event for said at least one telephone call campaign;
   c) modifying said at least one established success criteria event for and during each of said at least one telephone call campaigns;
   d) assigning an initial success index to each agent participating in said at least one telephone call campaign;
   e) directing calls to said plurality of agent resources, in a prioritized manner, whereby calls are connected to available agents in accordance with the value of agent success indices from highest to lowest;
   f) automatically updating each agent's success index after at least one handled call during said at least one telephone call campaign based on a comparison of a result of said at least one handled call and said at least one established success criteria event; and
   g) repeating acts e) through f) for each call.

2. The method of claim 1 wherein said act of assigning an initial success index to each agent participating in said at least one telephone call campaign further comprises the act of assigning a separate initial success index for each of said at least one telephone call campaign.

3. The method of claim 1, wherein said act of assigning a success index to each agent participating in said at least one telephone call campaign further comprises the act of using each said agent's historical performance to create a baseline success index.

4. The method of claim 1, wherein said act of updating each agent success index further comprises the act of increasing said index if an agent exceeds a threshold number of success criteria events during an established time period.

5. The method of claim 4, wherein said established time period comprises an hour.

6. The method of claim 4, wherein said established time period comprises a day.

7. The method of claim 1, wherein said act of updating each agent success index further comprises the act of updating each said agent success index based on a result of each call in said call campaign connected to each agent.

8. The method of claim 1, wherein said act of updating each agent success index further comprises the act of decreasing said index if an agent fails to maintain a high level of success during an established time period.

9. The method of claim 1, wherein said act of assigning a success index to each said agent further comprises the act of assigning a priority level selected from a plurality of established priority levels and wherein said act of updating said agent success index further comprises the act of updating an agent priority level based on said established success criteria.

10. The method of claim 1, wherein said act of updating each agent success index associated with each of the at least one telephone call campaign further comprises the act of recording a number of success criteria events achieved by each agent participating in a call campaign during an established time period, ranking all agents participating in said call campaign according to the recorded number of success events for each said agent and assigning a relative success index to each said agent based on said ranking.

11. A method of prioritizing agent resources to at least one telephone call campaign in a telephony system to maximize productivity of successful agents, said method comprising the acts of:
   a) providing a plurality of agent resources to participate in at least one telephone call campaign to be managed by said telephony system;
   b) establishing a plurality of agent priority levels;
   c) assigning one of said plurality of agent priority levels to each agent for each of said at least one telephone call campaign as an initial agent priority level;
   d) establishing at least one success criteria event for each of said at least one telephone call campaign;
   e) modifying said at least one established success criteria event for and during each of said at least one telephone call campaigns;
   f) connecting calls to said plurality of agent resources, in a prioritized manner, whereby calls are connected to available agents in accordance with agent priority levels from a highest to a lowest agent priority level;

g) comparing a result of each connected call with said established success criteria and recording a success event if said established success criteria is met;

h) automatically updating each said agent priority level associated with each call campaign based a number of recorded success events; and i) repeating acts f) though h) for each call.

12. The method of claim 11, wherein said act of updating each said agent priority level associated with each of the at least one telephone call campaign further comprises the act of increasing an agent priority level associated with a call campaign if said agent records a predetermined number of success events in an established time period.

13. The method of claim 11, wherein said act of updating each agent priority level associated with each of the at least one telephone call campaigns further comprises the act of decreasing an agent priority level if said agent fails to record a predetermined number of success events in an established time period.

14. The method of claim 11, wherein said act of updating each agent priority level associated with a call campaign further comprises the act of comparing the number of success events recorded by each agent participating in said call campaign during an established time period and assigning higher priority levels to those agents recording higher numbers of success events.

* * * * *